Oct. 18, 1966   TAKAO ANRAKU ET AL   3,279,993
STABILIZED AQUEOUS HEMOSTATIC PREPARATION
Filed Dec. 10, 1963
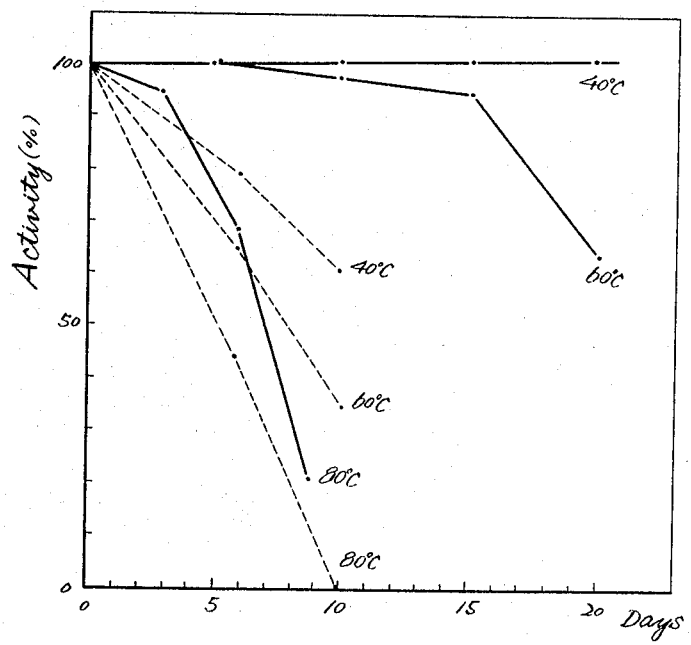
TAKAO ANRAKU
RENPEI NAGASHIMA
TOSHIO KOBAYASHI
INVENTORS.
BY E. M. Squire
THEIR ATTORNEY.

3,279,993
STABILIZED AQUEOUS HEMOSTATIC
PREPARATION
Takao Anraku, Iruma-gun, Seitama-ken, Renpei Nagashima, Katsushika-gun, Chiba-ken, and Toshio Kobayashi, Kitatama-gun, Tokyo, Japan, assignors to Chugai Seiyaku Kabushiki Kaisha, Tokyo, Japan, a corporation of Japan
Filed Dec. 10, 1963, Ser. No. 329,526
Claims priority, application Japan, Dec. 20, 1962, 37/56,118
2 Claims. (Cl. 167—74)

The present invention relates to a method for stabilizing an aqueous dispersion of phospholipides represented by lipid-thromboplastin having hemostatic action.

Hitherto, with a view to preventing the rancidity of fatty substances such as phospholipid, a lipid-soluble antioxidant such as, for example, butyl hydroxy anisole (BHA), nordihydroguaiaretic acid (NDGA), ethyl protocatechuate, α-tochopherol would be added to said fatty substances. However, the addition of said antioxidants to the aqueous dispersion of the phospholipid, which we have proposed in Japanese patent, is made with difficulty because said antioxidants are lipid-soluble but water-insoluble. Further most of said antioxidants are not preferable because of their liability to develop a reddish color upon standing under the light even in their sparingly dissolved aqueous solutions.

We have previously proposed a method for the stabilization of the hemostatic preparations by addition of ascorbic acid. The hemostatic activity of the preparation does not decrease so much even upon standing at room temperature. However, ascorbic acid itself would be oxidized to form a yellow substance and the dispersion also would turn yellow. It has been observed that in particular, if a different substance such as amino acid co-exists in the dispersion, the coloration could not be prevented.

The present invention has been resulted from our studies for obtaining a stable aqueous dispersion of hemostatic phospholipid which can be kept for a long period of time at room temperatures, without decreasing its hemostatic activity and coloring even in the presence of different substances as amino acid being added at will and are able to administered both intravenously and intramuscularly.

According to the present invention, a method for stabilizing phospholipid having hemostatic action is provided in which one or more of water-soluble reducing agents having sulfur atom or atoms in its molecule is added as stabilizer to an aqueous dispersion of phospholipid.

Example of these reducing agents may be employed are sulfites, bisulfites, meta-bisulfites, thiosulfates, sulfoxylates, α-mono-thioglycerol.

In the drawing, the single figure consists of comparative graphs illustrating blood platelet activity with and without the incorporation of potassium metabisulfite for varying storage periods at different temperatures.

An aqueous dispersion of phospholipid having hemostatic action in this invention means such one as is obtained by dispersing phospholipid having hemostatic action represented by lipid-thromboplastin into water or water containing sodium chloride, amino acid, vitamin or the like.

The water soluble reducing agents having sulfur atom or atoms in the molecule which are employed in this invention as the stabilizers and their stabilizing effects will be concretely explained. At first, as the more concrete examples of the stabilizers, sodium sulfite ($Na_2SO_3$), sodium bisulfite ($NaHSO_3$), potassium meta-bisulfite ($K_2S_2O_5$), sodium thiosulfate ($Na_2S_2O_3$), rongalite ($HOH_2C \cdot SO_2Na \cdot 2H_2O$), α-monothioglyerol $HSCH_2 \cdot CH(OH) \cdot CH_2OH$)

may be mentioned. All of these stabilizers, when one or more of them are added to the aqueous dispersion of phospholipid having hemostatic action act to consume oxygen dissolved in water by being oxidized themselves and prevent the hemostatic substances from autooxidation and polymerization caused by oxygen.

According to the present invention, it is extraordinarily advisable to introduce an inert gas as such as nitrogen gas into water in the process when the hemostatic substance is dispersed in water. By this procedure, oxygen contained in water may be replaced by the inert gas, whereupon the hemostatic substance may be prevented from being contacted with oxygen and the amount of the stabilizer to be employed may be saved.

According to the present invention, it is possible to obtain such a hemostatic agent as is free from decreasing of the activity and coloring and can be preserved for a long period of time at room temperature even in the presence of different substance such as incorporated amino acid. As amina acid, ε-aminocaproic acid, for example, which is commonly well known as an antifibrinolytic enzyme may be incorporated with the hemostatic substance. Further the hemostatic preparation of this invention can be adjusted to pH 6.0–8.0 as will, so that it may be administered intravenously and intramuscularly.

The degree of coloration of the hemostatic preparation stabilized by the method of the present invention freshly prepared and after standing under several severe conditions will be shown below, comparing with hitherto know preparations.

*Comparison of the degree of coloration based on the relative whiteness*

| Stabilizer | A | B | C | D | E | F |
|---|---|---|---|---|---|---|
| Conditions: | | | | | | |
| Freshly prepared | 80.5 | 82.3 | 100.0 | 88.9 | 99.2 | 99.8 |
| After standing at 100° C. for 10 hrs | 39.4 | 45.7 | 108.3 | 61.6 | 96.7 | 102.3 |
| After standing at 100° C. for 1 week | 38.9 | 46.2 | 87.7 | 67.7 | 82.3 | 90.6 |
| After standing at 1 week under ultra-violet rays | 63.3 | 68.9 | 105.0 | 87.7 | 94.1 | 95.4 |

Note:
A. No addition } Hitherto known method
B. Addition of ascorbic acid
C. Addition of potassium metabisulfite } Method of the present invention
D. Addition of α-mono-thioglycerol
E. Addition of bisulfite
F. Addition of rongalite The sample of freshly prepared C served as a control.

It is clear from the above table the hemostatic preparation stabilized by the method of this invention keeps extraordinarily high degree of relative whiteness and the stabilizers used present an excellent effect on prevention against coloration.

The stabilizing effect with the lapse of time of hemostatic action in case potassium metabisulfite is incorporated with lipid-thromboplastin. The results obtained with potassium meta-bisulfite added in concentration of 0.5 percent will be illustrated by the attached drawing.

The blood platelet activity of the sample was measured by means of thromboplastin-forming tests described in Biggs and Douglas: J. Clin. Path. June 23, 1953, after standing for 3–20 days at various temperature conditions. As shown in the drawing, solid lines represent the percent to the original activity in the case of postassium meta-bisulfite being incorporated and broken lines not incorporated. In the former case excellent stabilizing effects of hemostatic action are observed upon standing at every temperature, whereas in the latter case the activities fall rapidly at every temperature.

Further, similar results has been obtained with other stabilizers mentioned above.

Example 1

220 mg. of lipid-thromboplastin were added to 44 ml. of physiological solution containing 35.2 mg. of monionic surface active agent polyoxyethylene sorbitan monolaurate (Tween-20 produced by Atlas Powder Co.) while stirring and with introducing of nitrogen gas thereinto. After lipid-thromboplastin, being finely dispersed, 44 mg. of potassium meta-bisulfite were added. The dispersion was then adjusted to pH 7.0 and filtered. Each 5 cc. of thus obtained dispersion was sealed in brown ampoule, each ampoule having been with nitrogen prior to sealing, and then sterilized at 100° C. for 40 minutes to obtain a product.

Example 2

24 mg. of nonionic surface active agent polyoxyethylene sorbitan monolaurate (Tween-20) and 2 g. of ε-aminocaproic acid were dissolved in distilled water to make 40 ml. of solution. To the solution, while stirring and introducing nitrogen gas therein, a solution of 500 mg. of lipid-thromboplastin in 6 cc. of ether were added and finely dispersed, by heating to volatilizing of ether, to 50° C. on a water bath. After cooling to the room temperature 100 mg. of postassium meta-bisulfite were added to dissolve, the dispersion adjusted to pH 7.5 and filtered. Each 2 cc. of the dispersion thus obtained was sealed in brown ampoule each ampoule having been flushed with nitrogen prior to sealing and then sterilized.

Example 3

Instead of 44 mg. of potassium meta-bisulfite 44 mg. of sodium bisulfite were added as in Example 1.

Example 4

Instead of 100 mg. of postassium beta-bisulfite 100 mg. of sodium bisulfite were added as in Example 2.

Example 5

Instead of 44 mg. of postassium meta-bisulfite 44 mg. of sodium sulfite were added as in Example 1.

Example 6

Instead of 100 mg. of postassium meta-bisulfite 100 mg. of sodium sulfite were added as in Example 2.

Example 7

Instead of 100 mg. of potassium meta-bisulfite 100 mg. of rongalite were added as in Example 2.

Example 8

Instead of 100 mg. of postassium meta-bisulfite 100 mg. of α-monothioglycerol were added as in Example 2.

Example 9

Instead of 100 mg. of postassium meta-bisulfite 100 mg. of sodium thiosulfate were added as in Example 2.

The preparations above thus obtained do not suffer any undesirable changes such as coloration and the deterioration of hemostatic activity but are very stable and can be administered intravenously and intramuscularly.

What we claim is:

1. An aqueous hemostatic preparation containing lipid-thromboplastic which comprises a small amount of water-soluble reducing agent having at least one sulfur atom in its molecule and an aqueous dispersion of said lipid-thromboplastin.

2. The preparation according to claim 1, wherein said reducing agent is selected from the group consisting of sodium sulfite, sodium bisulfite, potassium meta-bisulfite, sodium thiosulfate, rongalite and α-monothioglycerol.

References Cited by the Examiner

UNITED STATES PATENTS

| 2,047,144 | 7/1936 | Kharasch | 167—65 |
| 2,719,812 | 10/1955 | Hanus | 167—65 |
| 2,970,944 | 2/1961 | Charnicki et al. | 167—65 |

FOREIGN PATENTS

| 35-5646 | 5/1960 | Japan. |
| 35-17148 | 11/1960 | Japan. |

OTHER REFERENCES

Lew et al.: "Food Technology," vol. 10, 1956 pp. 285–289.

JULIAN S. LEVITT, *Primary Examiner.*

GEORGE A. MENTIS, *Assistant Examiner.*